United States Patent [19]

Makishima et al.

[11] Patent Number: 5,635,789

[45] Date of Patent: Jun. 3, 1997

[54] COLD CATHODE

[75] Inventors: Hideo Makishima; Keizo Yamada; Hironori Imura, all of Tokyo, Japan

[73] Assignee: NEC Corporation, Tokyo, Japan

[21] Appl. No.: 368,385

[22] Filed: Dec. 30, 1994

Related U.S. Application Data

[63] Continuation of Ser. No. 35,618, Mar. 23, 1993, abandoned.

[30] Foreign Application Priority Data

Apr. 2, 1992 [JP] Japan ................... 4-080146

[51] Int. Cl.⁶ ........................................ H01J 1/30
[52] U.S. Cl. ..................... 313/309; 313/351; 313/336
[58] Field of Search ........................... 313/309, 336, 313/351, 495, 496, 497

[56] References Cited

U.S. PATENT DOCUMENTS

| | | | |
|---|---|---|---|
| 4,008,412 | 2/1977 | Yuito et al. | 313/309 |
| 4,498,952 | 2/1985 | Christensen | 313/309 |
| 4,721,885 | 1/1988 | Brodie | 313/336 |
| 5,030,895 | 7/1991 | Gray | 313/309 |
| 5,150,192 | 9/1992 | Green et al. | 313/309 |
| 5,191,217 | 3/1993 | Kane et al. | 313/336 |
| 5,243,252 | 9/1993 | Kaneko et al. | 313/309 |

FOREIGN PATENT DOCUMENTS

| | | |
|---|---|---|
| 0434330 | 6/1991 | European Pat. Off. . |
| 0121454 | 10/1978 | Japan ................... 313/309 |

OTHER PUBLICATIONS

C.A. Spindt et al., "Physical properties of thin–film emission cathodes with molybdenum cones," *Journal of Applied Physics*, vol. 47, No. 12, Dec. 1976, pp. 5248–5263.

*Primary Examiner*—Richard Hjerpe
*Assistant Examiner*—Lun-Yi Lao
*Attorney, Agent, or Firm*—Burns, Doane, Swecker & Mathis, LLP

[57] ABSTRACT

Disclosed is a field emission device which has an emitter formed in the center portion where ion bombardment is likely to occur, and a gate formed partially thicker, or which has a metal layer with the same potential as the emitter and a high melting point, formed in the center portion of the cathode. Therefore, even bombardment of positive ions at the center portion of the cold field emission device will not affect the electron emission, thereby ensuring an always stable cathode current or electron beam. Further, as the field emission device is designed to prevent the deterioration of the insulation between the emitter and gate, abrupt stopping of the electron emission hardly occurs. Therefore, an electron tube using this field emission device has a stable function and high reliability.

13 Claims, 3 Drawing Sheets

COLD CATHODE

This application is a continuation, of application Ser. No. 08/035,618, filed Mar. 23, 1993, now abandoned.

BACKGROUND OF THE INVENTION

1. Field of the Invention

The present invention relates to a cold cathode, and, more particularly, to a field emission device such as a using a vacuum microelectronics technology.

2. Description of the Related Art

FIG. 1 presents a cross section exemplifying a conventional field emission device, called the Spindt type, belonging to field emission device that use a vacuum microelectronics technology. As shown in FIG. 1, formed on a semiconductor substrate 1 are a cone-shaped emitter 2 that will serve as a minute emitters, an insulating layer 3, and a gate 4 formed of a metal layer. A positive voltage—positive with respect to the potential of the emitter that is the same as that of the semiconductor substrate 1—is applied to this gate 4. As the tip of the emitter 2 is very sharp, it is applied with a high electric field and thus emits electrons which correspond in an amount to the voltage applied to the gate 4.

The amount of current to be emitted from a single emitter 2 is as much as 10 to 100 µA. For use as the cathode of an electron tube, a number of emitters 2 are arranged two-dimensionally (see, for example, Journal of Applied Physics, Vol. 47, 1976, No. 12, pp. 5248 to 5263).

In an electron tube such as a traveling-wave tube or a cathode ray tube, when gas remaining in the electron tube hits an electron beam, it is ionized and the positive ions are accelerated through the center of the electron beam in the opposite direction to that of this beam, finally hitting the center portion of the cathode. This bombardment of the positive ions at the center portion of the cathode may destroy the emitters 2 in this area, stopping electron emission therefrom. The reduction in electron emission from the center portion decreases the cathode current accordingly, deforming the shape of the electron beam. Such phenomenon definitely makes the function of the electron tube unstable as the time passes. Further, the ion bombardment may cause melting or sputtering of the material of the cathode and mechanical deformation of the emitter 2 and gate 4, resulting in the electric short circuit of the emitter 2 with the gate 4. This disables the application of a voltage between the emitter 2 and gate 4, preventing electron emission from the whole cathode.

SUMMARY OF THE INVENTION

It is therefore an object of the present invention to provide a field emission device designed to prevent the reduction in cathode current and deformation of the shape of the electron beam, thereby ensuring stable performance of an electron tube with passage of time.

To achieve this object, there is provided a field emission device comprising a substrate of either a conductive type or a semiconductive type; an insulating layer deposited on the substrate; a metal layer deposited on the insulating layer; and minute emitters with a pointed tip formed of an electrode of either a conductive type or a semiconductive type, and provided in cavities formed in parts of the metal layer and the insulating layer, the metal layer, the insulating layer, the cavities and the minute emitters being formed on a portion of the substrate other than a center portion thereof.

Further, the metal layer, the insulating layer, the cavities and the minute emitters may be formed on a portion of the substrate other than the center portion thereof, with a second metal layer formed thicker than the first metal layer, on the center portion, or a second metal layer is formed in the center portion of the substrate of either a conductive type or a semiconductive type in such a way that the second metal layer contacts the substrate and is insulated from the metal layer.

According to the present invention, even if the center portion of the field emission device is bombarded with ions, the emitter is hardly destroyed and the insulation between the emitter and gate will not be deteriorated. It is therefore possible to always provide a stable cathode current or electron beam, and to prevent the cathode current or electron beam from being abruptly stopped by even such ion bombardment. The present invention can thus contribute to accomplishing a stable and reliable electron tube.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Preferred embodiments of the present invention will now be described referring to the accompanying drawings.

Figure 2A:
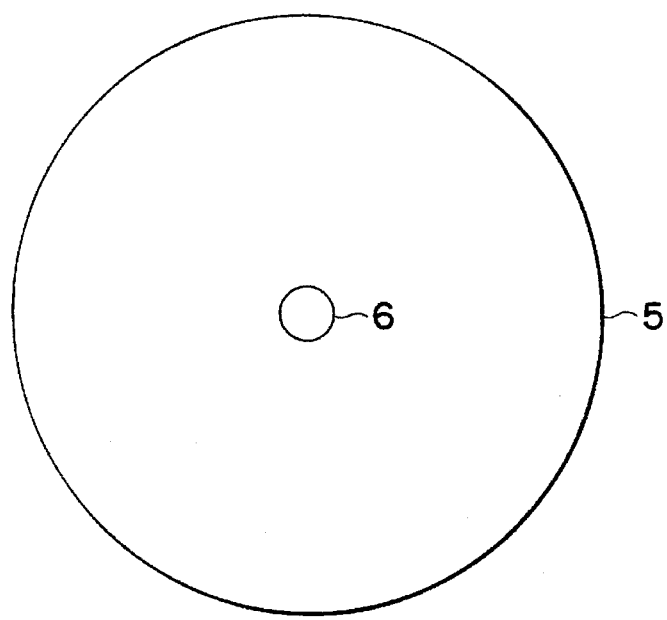
FIG. 2a and 2b present a plan view of a field emission device according to a first embodiment of the present invention and a partially enlarged cross-sectional view of the center portion of that field emission device.
Figure 2B:
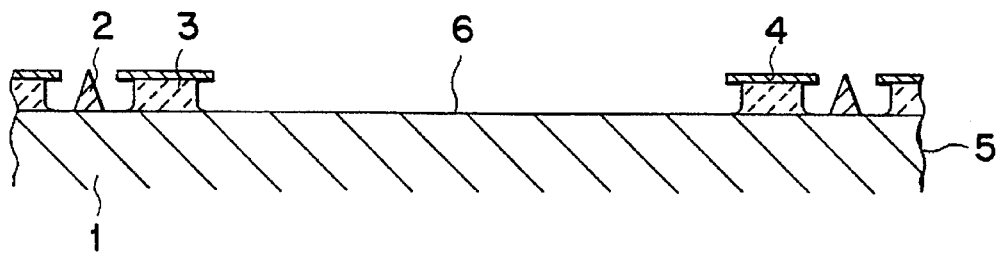

FIGS. 2A is a plan view of a field emission device according to a first embodiment of the present invention, and FIG. 2B a partially enlarged cross-sectional view of the center portion of that field emission device. In those diagrams, numeral 1 denotes a semiconductor substrate, numeral 2 an emitter, numeral 3 an insulating layer, numeral 4 a gate, numeral 5 a field emission device, and numeral 6 the center portion of that cathode.

According to the first embodiment, positive ions hit the center portion 6 of the field emission device where the semiconductor substrate 1 is exposed, as shown in FIGS. 2A and 2B. Since the emitter 2 and gate 4, which are sensitive to ion bombardment and are applied with a voltage with the insulating layer 3 therebetween, are not formed in the center portion 6, it is unlikely that the characteristics will change or the insulation will deteriorate. Even positive ions hit that portion where the semiconductor substrate 1 is exposed, the ion bombardment will not mechanically or thermally affect the emitter 2, insulating layer 3 and gate 4 around the center portion 6 of the field emission device.

Figure 3:
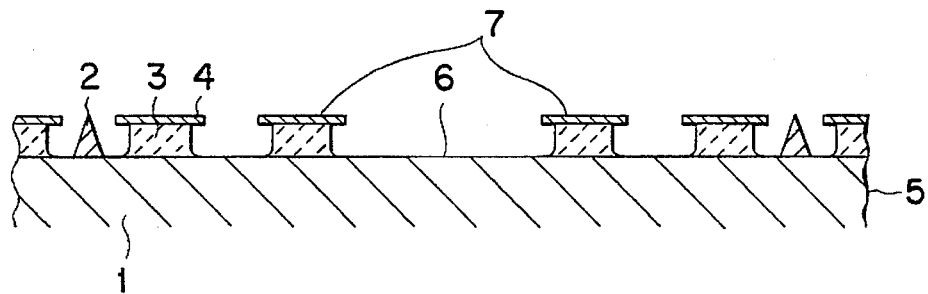
FIG. 3 is a cross section showing the center portion of a field emission device according to a second embodiment of the present invention.

FIG. 3 presents a cross section showing the center portion of a field emission device according to a second embodiment of the present invention.

The second embodiment has the same structure as the first embodiment shown in FIG. 2B except that it has a gate ring 7 as shown in FIG. 3. The gate ring 7 is formed of the same material, and at the same time, as the insulating layer 3 and gate 4. The gate ring is electrically insulated from the gate 4 and surrounds the field emission device center portion 6. Positive ions hit against the semiconductor substrate 1 inside the gate ring 7. Even if the material of the semiconductor substrate 1 or the like is sputtered by the bombardment of the positive ions, the possibility of the sputtered material sticking on the insulating layer 3 becomes smaller due to the presence of the gate ring 7 insulated from the gate 4. This can always ensure good insulation between the gate 4 and emitter 2 or between the gate 4 and semiconductor substrate 1.

Figure 4:
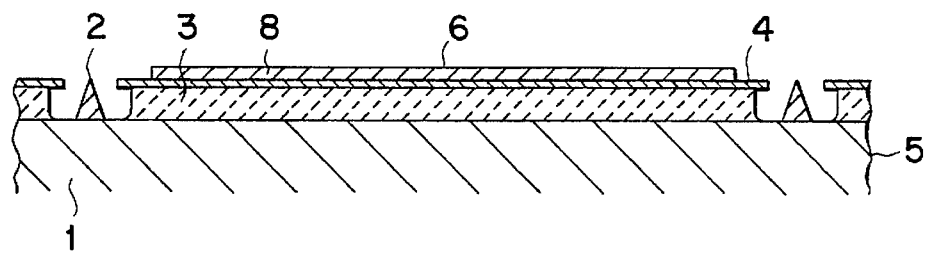
FIG. 4 is a cross section showing the center portion of a field emission device according to a third embodiment of the present invention.

FIG. 4 is a cross section showing the center portion of a field emission device according to a third embodiment of the present invention.

As shown in FIG. 4, the third embodiment has a uniform lamination of two layers, the insulating layer 3 and gate 4, at the field emission device center portion 6, where there are no emitters 2 or cavities for the emitter 2 formed in the insulating layer 3 and gate 4. A refractory metal layer 8 having a high melting point is formed on the gate 4 at the center portion 6. Since the metal layer 8 has a sufficient thickness besides the high-temperature resistance, even bombardment of positive ions there will not cause sputtering of the metal material or mechanical deformation of the metal layer 8, and insulation between the gate 4 and semiconductor substrate 1 will not be affected.

Figure 5:
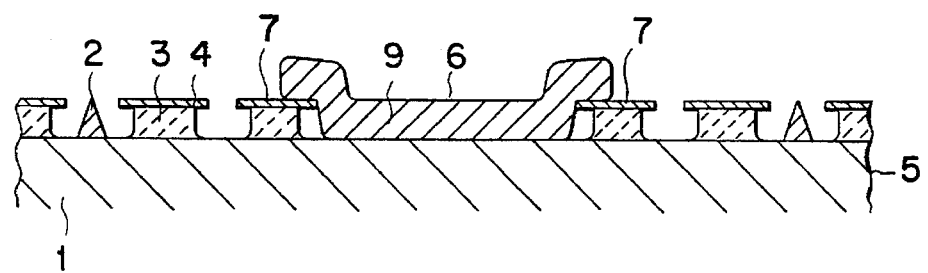
FIG. 5 is a cross section showing the center portion of a field emission device according to a fourth embodiment of the present invention.

FIG. 5 is a cross section showing the center portion of a field emission device according to a fourth embodiment of the present invention.

The fourth embodiment is the same as the second embodiment shown in FIG. 3 except for the presence of a metal layer (B) 9 as shown in FIG. 5. The metal layer (B) 9 is formed so as to cover the top of the gate ring 7 and the top of the semiconductor substrate 1 within the gate ring 7, and to electrically connect both. The metal layer 9 is electrically connected to the semiconductor substrate 1 and emitter 2. As the gate ring 7 is electrically insulated from the gate 4 as in the second embodiment, the metal layer (B) 9 is also insulated from the gate 4 electrically. This metal layer (B) 9 may be formed of the same material and at the same time as the emitter 2, or may be formed of a different material from that of the emitter 2. If the metal layer (B) 9 is formed of a refractiry metal having a high melting point, it is possible to eliminate the influence of bombardment of positive ions as in the third embodiment.

Figure 6:
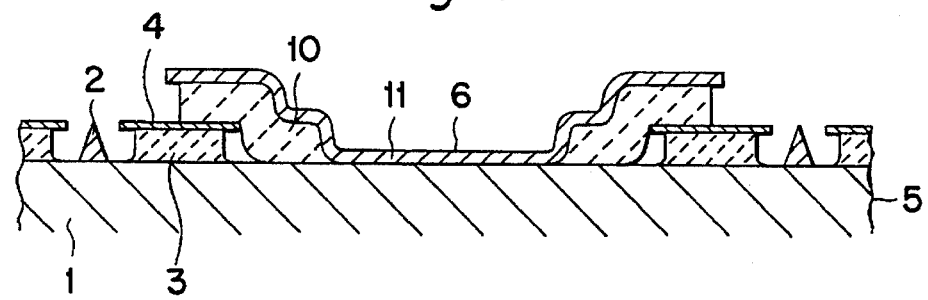
FIG. 6 is a cross section showing the center portion of a field emission device according to a fifth embodiment of the present invention.

FIG. 6 is a cross section showing the center portion of a field emission device according to a fifth embodiment of the present invention.

The fifth embodiment is the same as the first embodiment shown in FIG. 2B except for the presence of an insulating layer (B) 10 and a metal layer (C) 11 as shown in FIG. 6. The metal layer (C) 11 is in contact with the semiconductor substrate 1 at the center of the field emission device 5 and is faced with the gate 4 via the intervening insulating layer (B) 10 around the center portion 6 of the field emission device. Therefore, the metal layer (C) 11 is electrically connected to the semiconductor substrate 1 while being electrically insulated from the gate 4. If the metal layer (C) 11 is formed of a refractiry metal having a high melting point, it is possible to eliminate the influence of bombardment of positive ions as in the fourth embodiment shown in FIG. 5. Further, since the insulating layer 3 between the gate 4 and semiconductor substrate 1, particularly, that portion which contacts the field emission device center portion 6, is sufficiently covered with the insulating layer 10 and metal layer 11, the insulating performance of this insulating layer 3 hardly deteriorates.

In all the embodiments except the third one, the current of positive ions reaching the field emission device flows out to an external circuit through a wire connected to the gate 4.

Figure 1:
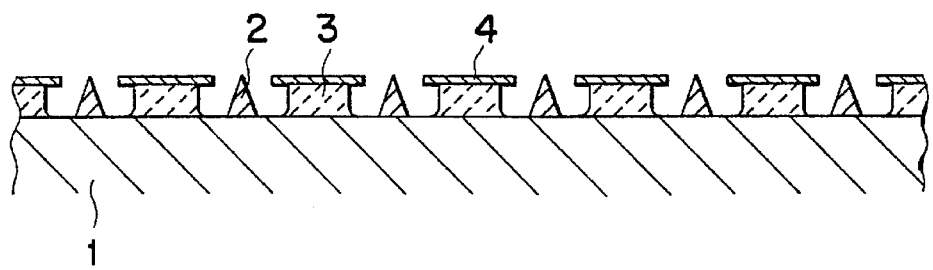
FIG. 1 is a cross section illustrating one example of a conventional field emission device, called the Spindt type, belonging to field emission device that use a vacuum microelectronics technology.

The first embodiment shown in FIGS. 2A and 2B and the second embodiment shown in FIG. 3 can be fabricated in quite the same process as the conventional field emission device shown in FIG. 1.

FIGS. 7A through 7D present cross sections illustrating step by step a method of fabricating the third embodiment shown in FIG. 4. The fourth and fifth embodiments can be fabricated in almost the same process as illustrated in FIGS. 7A through 7D.

Figure 7A:
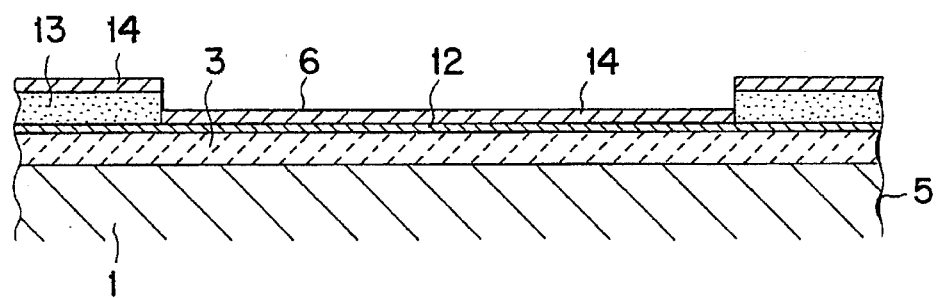
FIG. 7a through 7d present cross sections giving a step-by-step illustration of a method of fabricating the third embodiment shown in FIG. 4.

In the third embodiment, first the semiconductor (silicon) substrate 1 is thermally oxidized to form a silicon oxide film thereon as the insulating layer 3. Then, the gate metal layer 12 is deposited on the insulating layer 3 by vapor deposition or sputtering technology. Next, the top of the gate metal layer 12, excluding the field emission device center portion 6, is coated with a resist 13 using a lithography technology. Then, metal for forming the metal layer 8 is deposited on the top of the resultant structure to form a metal layer 14 overlying the gate, thus yielding the structure as shown in FIG. 7A.

Figure 7B:
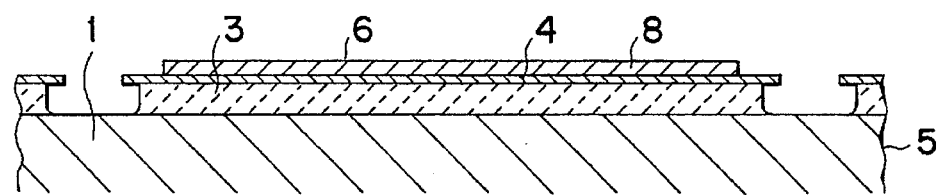

Subsequently, the resist 13 and the overlying metal layer 14 are removed using a lift-off technology, forming the metal layer 8. Then, part of the gate metal layer 12 is removed to form the gate 4 using a lithography technology, and with the gate 4 as a mask, part of the insulating layer 3 is etched off, yielding the structure as shown in FIG. 7B.

Figure 7C:
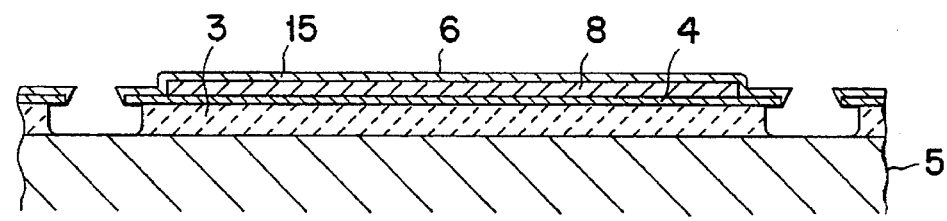

Then, the semiconductor substrate 1 is positioned obliquely in a vapor depositing device so that a material to be vapor-deposited is sputtered from the oblique direction of the semiconductor substrate 1, and the semiconductor substrate 1 is rotated, forming an obliquely vapor-deposited metal layer 15. The resultant structure is shown in FIG. 7C.

Figure 7D:
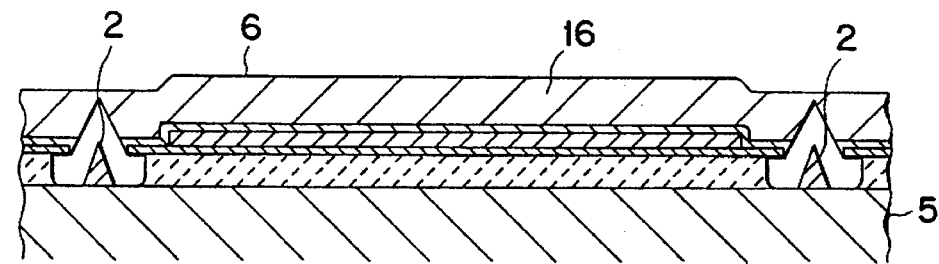

Then, emitter metal is vapor-deposited on the semiconductor substrate 1 directly above, so that an emitter metal layer 16 is formed on the metal layer 15, and at the same time, emitters 2 which become narrower toward their tips are formed on the semiconductor substrate 1 through cavities formed in the metal layer 15. The resultant structure is shown in FIG. 7D.

Finally, the metal layer 15 and emitter metal layer 16 are removed to provide the structure of the third embodiment as shown in FIG. 4.

Although the foregoing description of the embodiments has been given with respect to field emission device that have metal emitters, it should be apparent to those skilled in the art that the first to fifth embodiments can also be applied to a field emission device having emitters made of a semiconductor such as silicon.

Further, the metal layer 8 on the gate 4 in the third embodiment should not necessarily be located at the center portion of the field emission device, but may be formed all over the field emission device, excluding the area around the cavities formed in the gate 4. In this case, reduction in the film resistance of the gate 4 is accomplished besides the original advantages of the third embodiment, thus preventing a voltage drop at the gate 4 from occurring due to the flow of the ion current.

In short, even bombardment of positive ions at the center portion of the field emission device of the present invention will not affect the electron emission, thereby ensuring an always stable field emission device current or electron beam. Further, as the insulation between the emitter and gate will not be deteriorated, abrupt stopping of the electron emission hardly occurs. Therefore, an electron tube using the field emission device of the present invention has a stable function and high reliability.

Therefore, the present examples and embodiments are to be considered as illustrative and not restrictive and the invention is not to be limited to the details given herein, but may be modified within the scope of the appended claims.

What is claimed is:

1. A field emission device comprising:

a substrate of either a conductive type or a semiconductive type; and plural elements each having:
an insulating layer deposited on said substrate;
a metal layer deposited on said insulating layer; and
a minute emitter with a pointed tip formed of an electrode of either a conductive type or a semiconductive type, and provided in a cavity formed in parts of said metal layer and said insulating layer, wherein said plural elements are formed in a matrix around a center portion of the field emission device, and wherein the center portion of the field emission device is for protecting the emitters of said plural elements from ions and has a diameter much longer than the distance between two emitters next to each other.

2. The field emission device according to claim 1, wherein a second metal layer is formed in said center portion of said substrate of either a conductive type or a semiconductive type in such a way that said second metal layer contacts said substrate and is insulated from said metal layer.

3. The field emission device of claim 1, wherein said metal layer, said insulating layer, said cavities and said minute emitters are not formed on said center portion of said substrate.

4. The field emission device according to claim 1, wherein said plural elements are in the form of a ring-shaped matrix around said center portion.

5. The field emission device according to claim 1, wherein said center portion of said field emission device is a center potion of said substrate where ion bombardment is likely to occur.

6. The field emission device of claim 5, wherein said metal layer, said insulating layer, said cavities and said minute emitters are not formed on said center portion of said substrate.

7. A field emission device comprising:

a substrate of either a conductive type or a semiconductive type;

an insulating layer deposited on said substrate;

a first metal layer deposited on said insulating layer;

minute emitters each with a pointed tip formed of an electrode of either a conductive type or a semiconductive type, and provided in cavities formed in parts of said metal layer and said insulating layer, said metal layer, said insulating layer, said cavities and said minute emitters being formed in a matrix aroumd a center portion of the field emission device, wherein the center portion of the field emission device is for protecting the emitters of said plural elements from ions and has a diameter much longer than the distance between two emitters next to each other, and a second metal layer formed directly on said first metal layer at said center portion of said substrate, said second metal layer having a greater thickness than that of said first metal layer.

8. A field emission device comprising:

a substrate;

an insulating layer formed on said substrate;

a metal layer formed on said insulating layer;

cavities formed in said insulating and metal layers;

emitters formed in at least some of said cavities in a matrix around a center portion of the field emission device wherein the center portion of the field emission device is for protecting the emitter of said plural elements from ions and has a diameter much longer than the diameter between two emitters next to each other; and means for protecting said emitters from ions which impact on a center portion of said field emission device.

9. The field emission device of claim 8 wherein said means for protecting said emitters further comprises:

disposing said emitters at a given spacing on a portion of said field emission device outside of said center portion surrounding a center of said field emission device and increasing said spacing within said center of said field emission device.

10. The field emission device of claim, 8 wherein said means for protecting said emitters further comprises:

a gate ring which is electrically insulated from a gate formed on said substrate and surrounds said center portion of said field emission device.

11. The field emission device of claim 8, wherein said means for protecting said emitters further comprises:

said center portion of said field emission device lacking cavities in said insulating and metal layers; and a refractory metal layer formed on said metal layer in said center portion.

12. The field emission device of claim 8 wherein said means for protecting said emitters further comprises:

a second metal layer which covers a top of said gate ring and said center portion of said field emission device, thereby electrically connecting said gate ring and said substrate.

13. The field emission device of claim 8, wherein said means for protecting said emitters further comprises:

a second insulating layer covering said center portion of said field emission device and at least part of gate electrode proximate said center portion; and a second metal layer covering said second insulating layer.

* * * * *